United States Patent
Yamada

[11] Patent Number: 6,140,999
[45] Date of Patent: Oct. 31, 2000

[54] COORDINATE INPUT DEVICE AND A PROGRAM-RECORDING MEDIUM FOR USE IN SUCH A DEVICE

[75] Inventor: Yoshihiro Yamada, Ayama-gun, Japan

[73] Assignee: Sharp Kabushiki Kaisha, Osaka, Japan

[21] Appl. No.: 08/922,451

[22] Filed: Sep. 3, 1997

[30] Foreign Application Priority Data

Sep. 17, 1996 [JP] Japan .................................. 8-244352

[51] Int. Cl.⁷ .................................................. G09G 5/00
[52] U.S. Cl. ........................ 345/173; 345/179; 178/19.01; 178/19.03
[58] Field of Search ..................................... 345/173, 179; 178/18, 19, 20, 18.01, 18.03, 18.06, 19.01, 19.03

[56] References Cited

U.S. PATENT DOCUMENTS

| | | | |
|---|---|---|---|
| 4,730,186 | 3/1988 | Koga et al. | 340/708 |
| 5,134,689 | 7/1992 | Murakami et al. | 395/143 |
| 5,420,607 | 5/1995 | Miller et al. | |
| 5,717,432 | 2/1998 | Miwa et al. | 345/173 |

FOREIGN PATENT DOCUMENTS

| | | |
|---|---|---|
| 04 32139A2 | 6/1991 | European Pat. Off. |
| 05 91083A1 | 4/1994 | European Pat. Off. |
| 06 07694A1 | 7/1994 | European Pat. Off. |
| 06 15209A2 | 9/1994 | European Pat. Off. |
| 6-21024A | 1/1987 | Japan |
| 04 177518 | 6/1992 | Japan |
| 08 115154 | 5/1996 | Japan |

*Primary Examiner*—Richard A. Hjerpe
*Assistant Examiner*—Kimnhung Nguyen

[57] ABSTRACT

A coordinate input device, which detects a signal outputted from a coordinate input pen on the surface of a tablet and converts it into coordinate data, is provided with: a phase-control circuit for shifting the phase of an ac signal from the device main body and for outputting the resulting signal to the coordinate input pen; a Sense Amp circuit for amplifying the ac signal with its phase changed that was outputted from the coordinate input pen and has been detected on the tablet surface; a phase-difference detection circuit for detecting the phase difference between the signal amplified by the Sense Amp circuit and the ac signal from the device main body; and a color conversion circuit for outputting, together with coordinate data, a specific piece of color information that corresponds to the phase difference that has been detected by the phase-difference detection circuit from pieces of color information that have been preliminarily stored in association with phase differences.

14 Claims, 7 Drawing Sheets

FIG.6(a)
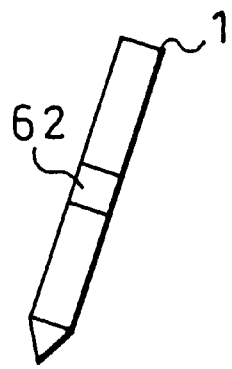
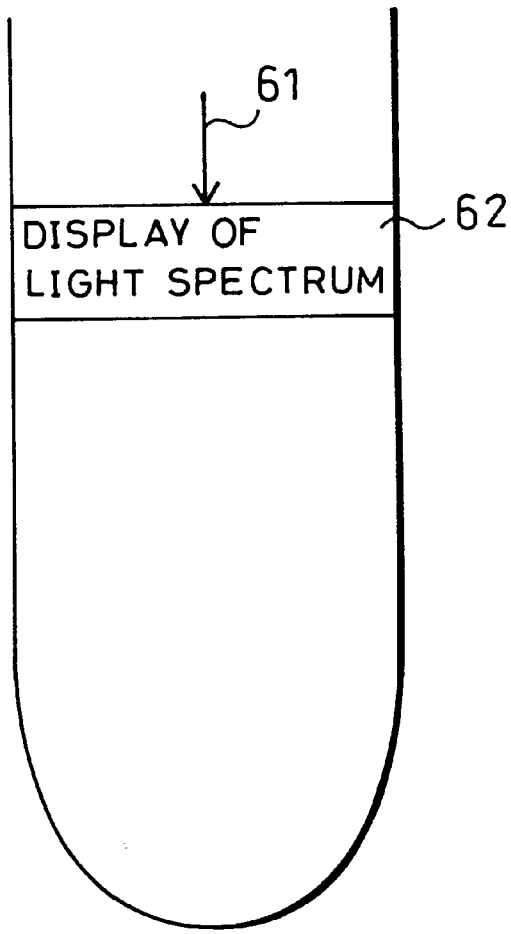
FIG.6(b)

FIG.7(a)
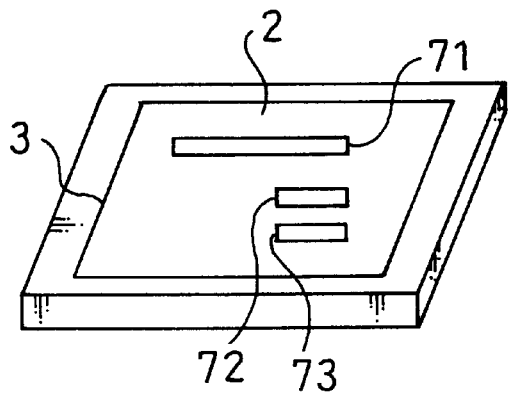
FIG.7(b)
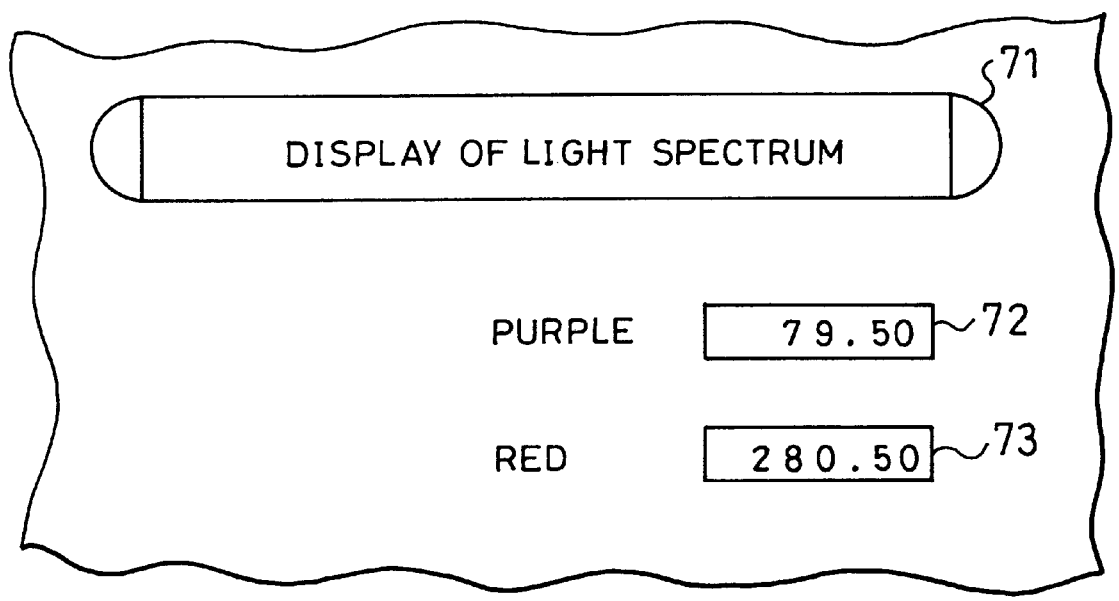
DISPLAY OF LIGHT SPECTRUM
PURPLE  79.50 ~72
RED  280.50 ~73
FIG.8
| PURPLE | RED |
|--------|-----|
| 0      | 360 |

COORDINATE INPUT DEVICE AND A PROGRAM-RECORDING MEDIUM FOR USE IN SUCH A DEVICE

FIELD OF THE INVENTION

The present invention relates to a coordinate input device that is applicable to computers for processing handprinted characters, graphics, etc., and also concerns a program-recording medium used for such a device.

BACKGROUND OF THE INVENTION

Coordinate input devices have an input-use panel called a tablet, and a certain position on this panel is specified by means of a pen, a mouse, etc., so that the coordinates of the specified position is inputted. Moreover, some coordinate input devices are provided with a display panel such as an LCD on the under-surface of the tablet, and the position of the inputted coordinates are displayed on the display panel.

A conventional coordinate input device having a color display means is normally provided with a color-selection means on the tablet side, which selects display colors, and selection is made from a limited number of colors displayed on the tablet by means of a pen, a mouse, etc.

Here, Japanese Laid-Open Patent Publication No. 177518/1992 (Tokukaihei 4-177518) discloses a construction wherein a switch for selecting display colors is installed on the pen side. Further, Japanese Laid-Open Patent Publication No. 115154/1996 (Tokukaihei 8-115154) discloses a construction wherein: a magnetic field having a certain intensity is generated among plurality of magnetic fields having mutually different intensities, and display is made by using a color corresponding to the intensity of the magnetic field.

However, in any of the above-mentioned arrangements, selectable colors are preliminarily set in a fixed and limited manner, and even if the user desires a half-tone color or color that is subtly different from any of the set colors, he or she has to select a color that is close to the desired color among the set colors. Therefore, these arrangements have failed to display half-tone colors or colors that are subtly different from set colors.

Moreover, in conventional arrangements, when the user tries to change a displayed color, he or she has to call for a color-setting menu onto the tablet so as to make a selection; this requires that the user has to carry out many operations by contacting the pen onto the tablet every time he or she tries to change displayed colors, resulting in a problem of complex operations.

SUMMARY OF THE INVENTION

The first objective of the present invention is to provide a coordinate input device which is capable of inputting virtually limitless colors upon making a selection of colors and displaying even half-tone colors and colors that are subtly different from each other.

Further, the second objective of the present invention is to provide a coordinate input device which is capable of changing and resetting display colors with a simple operation.

Moreover, the third objective of the present invention is to provide a program-recording medium that carries out necessary processes for such a coordinate input device.

In order to achieve the above-mentioned objectives, the coordinate input device of the present invention, which detects a signal outputted from a coordinate input pen on the surface of a tablet and converts it into coordinate data, is provided with: a phase-conversion circuit for shifting the phase of an ac signal from the device main body and for outputting the resulting signal to the coordinate input pen; an amplification circuit for amplifying the ac signal with its phase changed that was outputted from the coordinate input pen and has been detected on the tablet surface; a phase-difference detection circuit for detecting the phase difference between the signal amplified by the amplification circuit and the ac signal from the device main body; and a color conversion circuit for outputting, together with coordinate data, a specific piece of color information that corresponds to the phase difference that has been detected by the phase-difference detection circuit from pieces of color information that have been preliminarily stored in association with phase differences.

With the above-mentioned coordinate input device, display colors can be set and changed to virtually limitless kinds of colors by converting phase differences into colors by the use of a simple operation.

It is preferable for the coordinate input device to incorporate the phase-conversion circuit into the coordinate input pen. With this arrangement, the user can specify colors easily by carrying out the color-setting operations on the pen side.

Moreover, it is also preferable for the coordinate input device to have an arrangement wherein: a color display means is provided on the under-surface of the tablet and the phase-conversion circuit is controlled by selecting the color to be displayed based on color-selection information displayed on the tablet. With this arrangement, the user can carry out color-setting operations on the main-body side while confirming the setting state displayed on the screen; thus, it is possible to carry out an accurate color-selection.

In order to achieve the above-mentioned objective, the program-recording medium of the present invention, which is a recording medium for recording a program that is used to detect a signal outputted from a coordinate input pen on the surface of a tablet and to convert it into coordinate data, has a recorded program for executing the steps of: shifting the phase of an ac signal from the device main body and outputting the resulting signal to the coordinate input pen; amplifying the ac signal with its phase changed that was outputted from the coordinate input pen and has been detected on the tablet surface; detecting the phase difference between the signal amplified by the amplification means and the ac signal from the device main body; and outputting together with coordinate data color information that corresponds to the phase difference that has been detected through said step from pieces of color information that have been preliminarily stored in association with phase differences.

For a fuller understanding of the nature and advantages of the invention, reference should be made to the ensuing detailed description taken in conjunction with the accompanying drawings.

BRIEF DESCRIPTION OF THE DRAWINGS

FIGS. 6(a) and 6(b) are schematic drawings that show an arrangement wherein a pen has a scale and a rotation section that serve as a color-setting device in the above-mentioned coordinate input device.

FIGS. 7(a) and 7(b) are explanatory drawings that show an example wherein a bar, displayed on a tablet, functions has a color-setting device in the above-mentioned coordinate input device.

FIG. 8 is a drawing that shows a color-setting table of the above-mentioned coordinate input device.

DESCRIPTION OF THE EMBODIMENTS

Referring to FIGS. 1 through 8 the following description will discuss one embodiment of the present invention.

Figure 1:
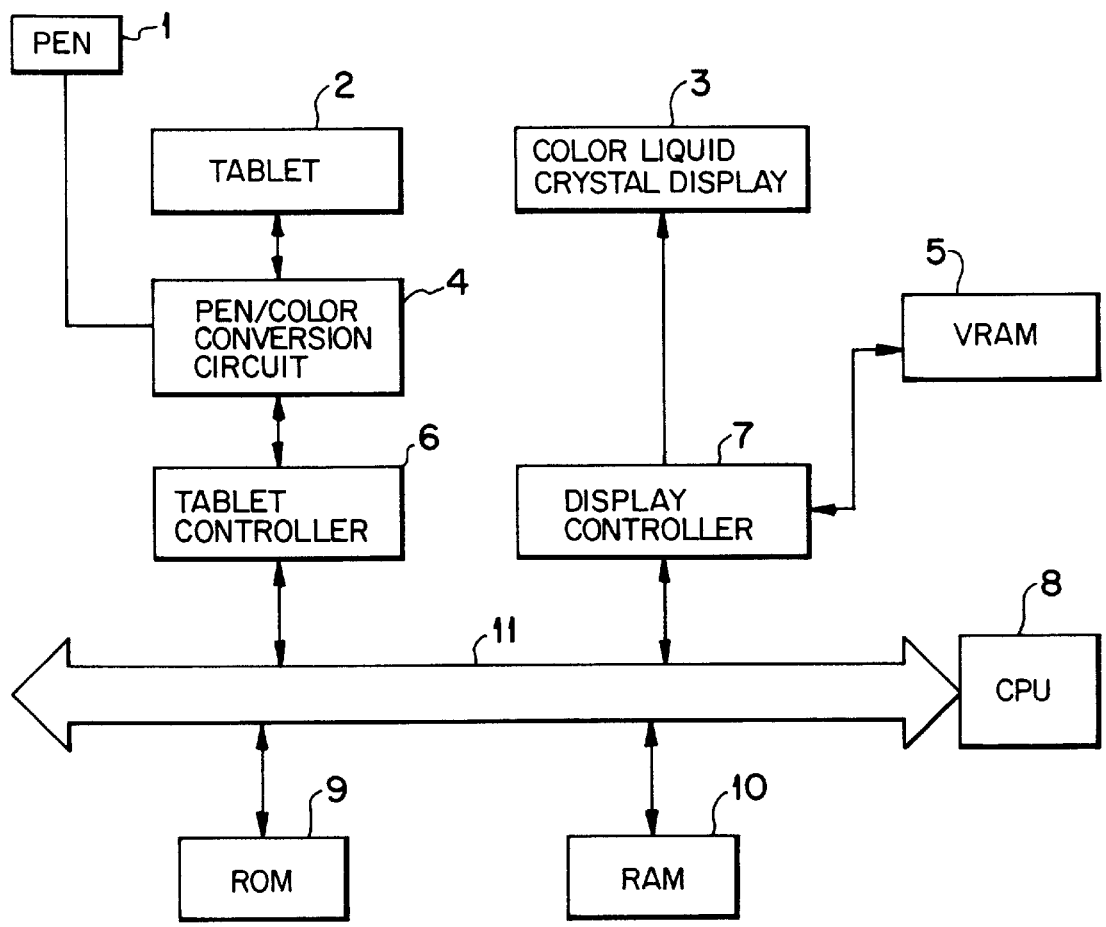
FIG. 1 is a schematic drawing that shows an arrangement of a coordinate input device in accordance with one embodiment of the present invention.

As shown in FIG. 1, the coordinate input device of the present embodiment is provided with: a pen 1, a tablet (panel) 2, a color liquid crystal display 3, a pen/color conversion circuit 4, a VRAM 5, a tablet controller 6, a display controller 7, a CPU 8, a ROM (a program-recording medium) 9, a RAM 10 and a bus line 11.

The pen 1 specifies a position on the tablet 2 when it comes into contact therewith, and serves as a pointing device for inputting coordinates of the position. The tablet 2 detects a signal outputted from the pen 1, and converts it into coordinate data regarding the position specified by the pen 1. The color liquid crystal display 3, placed on the undersurface of the tablet 2, is a display for displaying an image of the position specified by the pen 1 including its locus.

The pen/color conversion circuit 4 includes a phase control circuit 13, a phase detector circuit 16 and color conversion circuit 17 (see FIG. 2), which will be described later. The pen/color conversion circuit 4 converts a display color into a desired color that has been set and selected by a setting device from limitless kinds of colors, as will be described later.

The VRAM 5 stores displayed images. The tablet controller 6 controls data from the tablet 2, and the display controller 7 controls the display 3 so that an image is displayed on the color display 3 based on the coordinate data.

The ROM 9 and the RAM 10 store data and processing programs. The ROM 9 stores programs for controlling the operation of the apparatus main body. The RAM 10 temporarily stores color data.

The CPU 8 controls the VRAM 5, the tablet controller 6, the display controller 7, the ROM 9, the RAM 10 and other devices based upon the programs stored in the ROM 9.

The bus line 11 is a line for transferring data. The bus line 11 transmits data from the ROM 9, the RAM 10, the tablet controller 6 and the display controller 7 to the CPU 8.

Additionally, the devices, such as the CPU 8, the ROM 9 and RAM 10, may be provided as media that can be freely installed and removed as external devices.

Upon carrying out a coordinate input, the tablet controller 6 sends a signal to the pen 1 that is in contact with the tablet 2, and also receives coordinate data regarding the specified position of the pen 1 from the tablet 2.

In order to convert a display color into a desired color that has been set and selected from virtually limitless kinds of colors through a rotation section 62 (see FIG. 6) of the pen 1, or a bar 71 (see FIG. 7) displayed on the tablet 2, which serves as a setting device, the pen/color conversion circuit 4 sends data of a color signal regarding the color thus set and selected to the CPU 8 through the bus line 11, based upon the phase detection of the input signal from the pen 1.

The CPU 8 stores the data of the color signal regarding the color set and selected from limitless kinds of colors in the RAM 10 in accordance with a command of a corresponding program stored in the ROM 9. The tablet 2 outputs the coordinate data in response to the contact of the pen 1, and the coordinate data is inputted to the CPU 8 through the tablet controller 6.

The CPU 8 sends the coordinate data and the color data stored in the RAM 10 to the display controller 7 in accordance with a command from the ROM 9. The display controller 7 converts the coordinate data and color data into color-image data, and stores it in the VRAM 5.

The color-image data, released from the VRAM 5, is sent to the color display 3 through the display controller 7, and displayed thereon.

Figure 2:
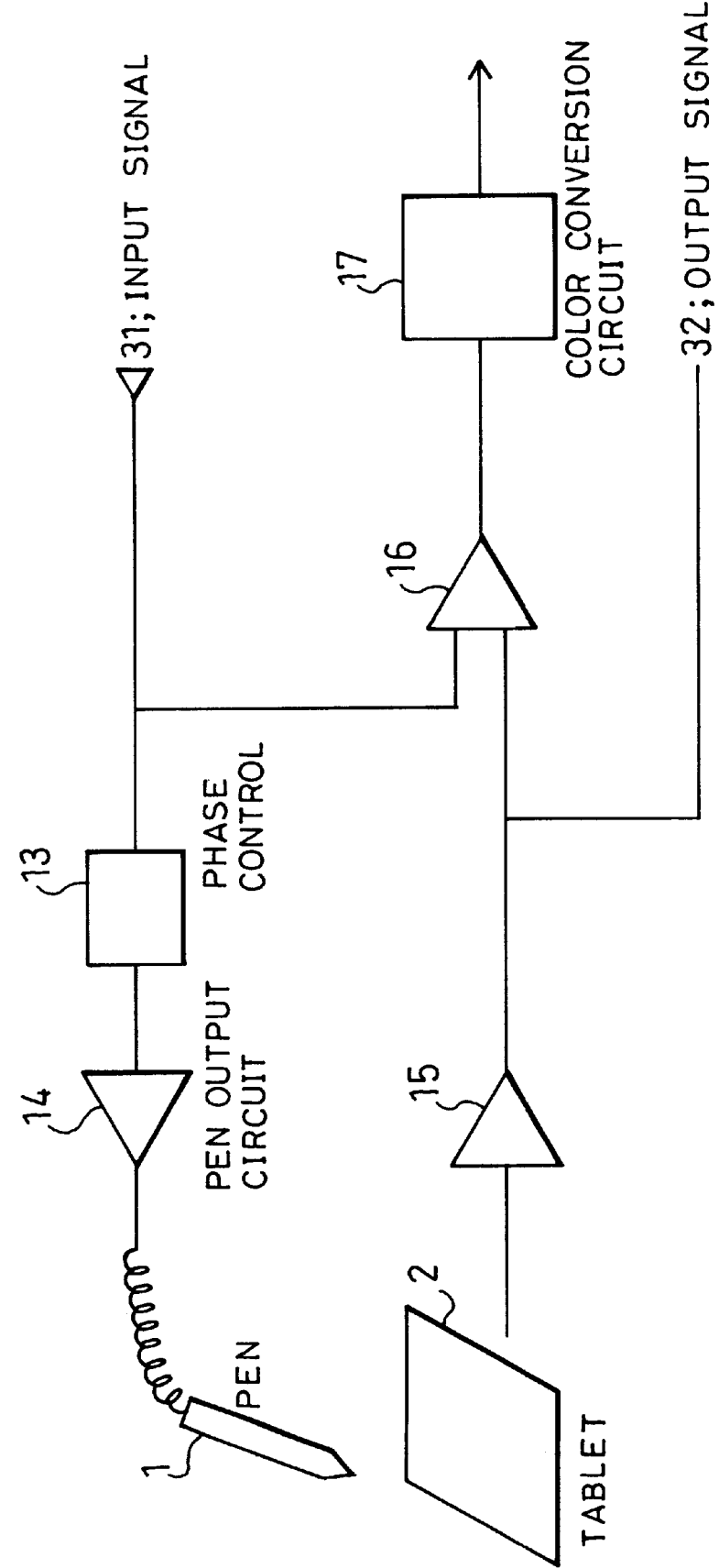
FIG. 2 is a block diagram showing an arrangement related to setting and converting processes of display colors in the above-mentioned coordinate input device.

Moreover, as illustrated in FIG. 2, besides the pen 1 and the tablet 2, the present coordinate input device is provided with a phase-control circuit 13, a pen-output circuit 14, a Sense Amp circuit 15, a phase-detection circuit (phase-difference detection device) 16 and a color-conversion circuit 17, in order to convert display colors.

The phase-control circuit 13 serves as a phase-conversion means for shifting the phase of an input ac signal based upon the setting made by the operator. The Sense Amp circuit 15 is an amplification circuit for amplifying a minute signal, and the phase-detection circuit 16 is a circuit for detecting the phase difference between an input signal 31 and an output signal 32. Further, the color-conversion circuit 17 is a circuit for setting a color from the phase difference detected by the phase-detection circuit 16.

Figure 3:
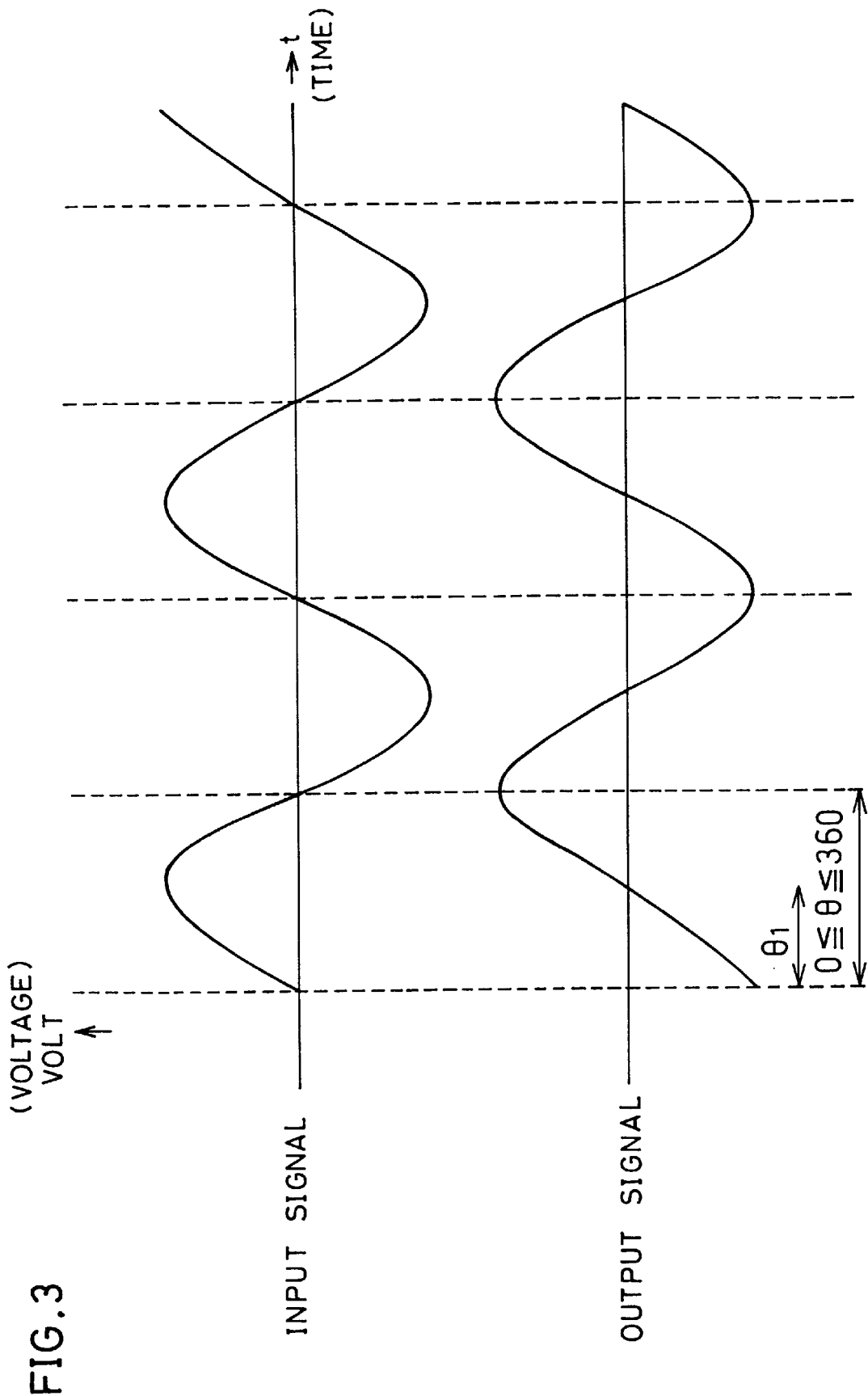
FIG. 3 is waveform chart that shows an ac signal that is inputted to an phase-control circuit of the coordinate input device and the resulting ac signal outputted from the circuit with a shifted phase.

FIG. 3 is a drawing that shows examples of waveforms of the input signal 31 and output signal 32. In this Figure, the axis of abscissa represents time and the axis of ordinate represents voltage. Here, one cycle of the waveform is defined as 360 degrees.

The input signal 31 represents a waveform of an ac signal released from the device main body, and the output signal 32 represents a waveform of an ac signal inputted from the tablet 2.

Next, referring to FIGS. 2 and 3, an explanation will be given of a conversion process for display colors in the present coordinate input device.

The input ac signal 31 is sent to the phase-control circuit 13 and the phase-detection circuit 16 through cables. The input signal 31, sent to the phase-control circuit 13, has its phase shifted, for example, by θ1 based upon the setting made by the operator, and is outputted with the waveform of the output signal 32.

The signal, whose phase has been shifted by θ1, is transmitted to the tablet 2 through the tip of the pen 1 by the pen-output circuit 14. Upon receipt of the signal, the tablet 2 transmits the received signal as an input signal.

The input signal, transmitted by the tablet 2, is amplified by the Sense Amp circuit 15 since it is a weak signal. The phase-detection circuit 16 detects the phase difference between the resulting amplified signal and the input signal 31 from the device main body, and sends the detected voltage value to the color-conversion circuit 17, and the color-conversion circuit 17 sends a signal representative of a color that is predeterminately set depending on the voltage value to the device main body.

Here, upon shifting the phase in the phase-control circuit 13, the value of θ corresponding the shift is desirably set in the range of 0≦θ≦360.

Figure 4:
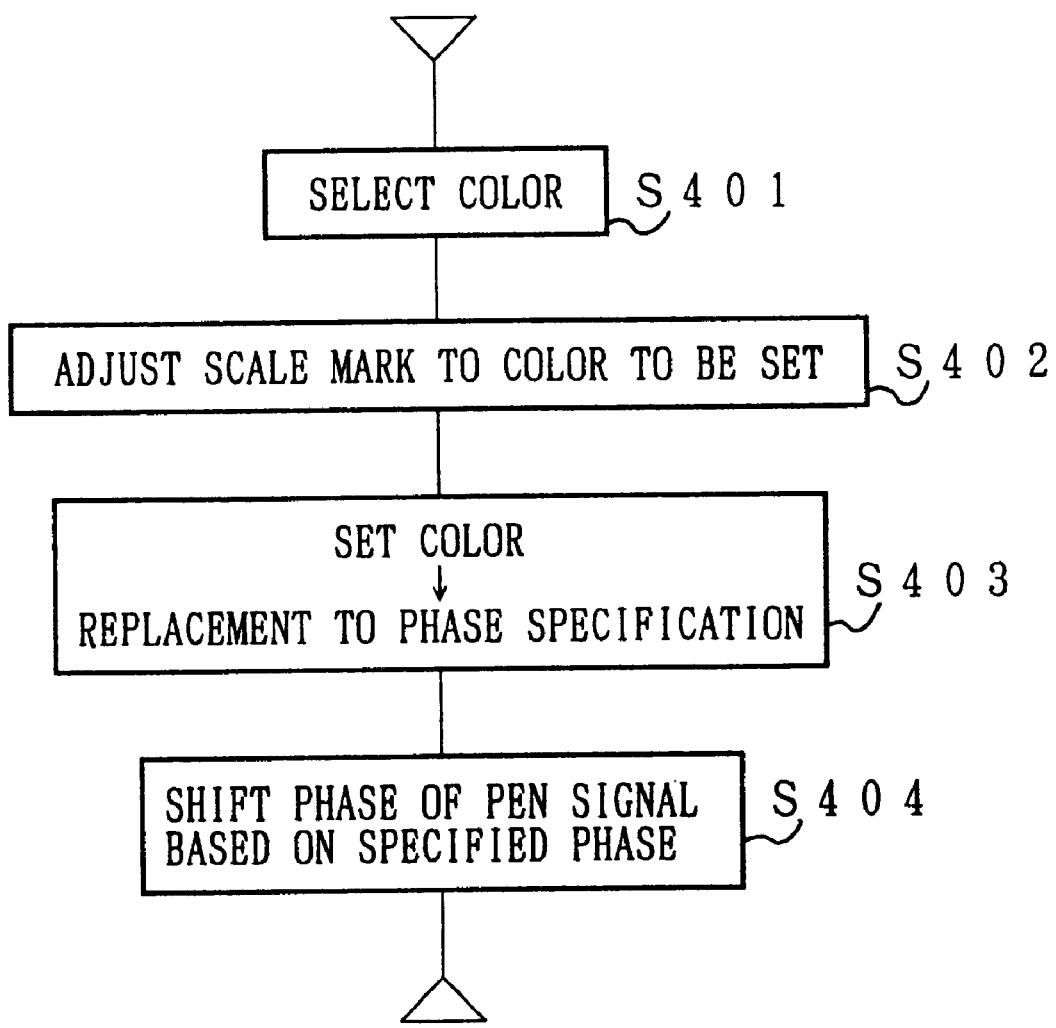
FIG. 4 is a flow chart that shows setting and converting processes of display colors in the above-mentioned coordinate input device.

FIG. 4 is a flow chart indicating the color setting and converting processes.

First, the operator selects and determines which color to be set (S401), and adjusts the mark of a scale installed on the setting means such as the rotation section 62 of the pen 1 or the bar 71 on the tablet 2 to the color to be set (S402).

When the scale mark is adjusted to the color to be set (S402), a signal representative of the set color is sent to the phase-control circuit 13, and is used for specifying the phase (S403). Based upon the phase thus specified, the phase of a signal that is to be inputted to the pen 1 is shifted (S404).

Figure 5:
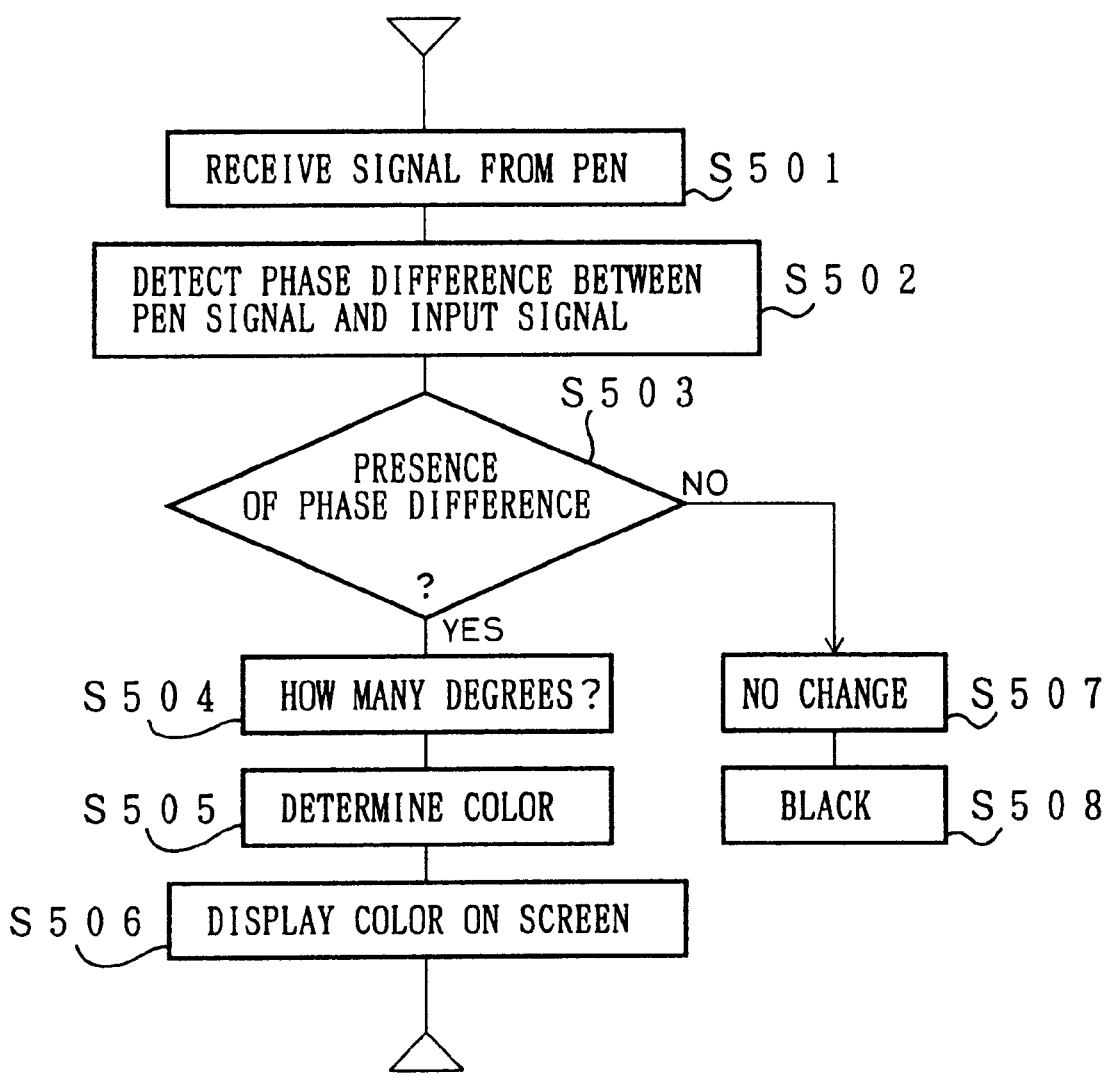
FIG. 5 is a flow chart that shows setting and converting processes of display colors in the above-mentioned coordinate input device.

Next, as shown in FIG. 5, upon receipt of the signal from the pen 1 through the phase-control circuit 13 (S501), the phase-detection circuit 16 detects the phase difference in comparison with the input signal from the device main body (S502), and if the phase-detection circuit 16 recognizes that there is a phase difference (S503), it detects the degree of the phase difference (S504).

The color-conversion circuit 17 determines the color depending on the phase difference thus detected (S505). Upon receipt of the signal, the display 3 replaces the display color (S506). Here, if there is no phase difference (S507), the color is specified as black (S508).

FIG. 6 shows a construction wherein the pen 1 has the scale mark 61 and the rotation section 62 as the setting device.

The rotation section 62 is installed so as to rotate centered on the axis of the pen 1, and the light spectrum, color samples ranging from purple to red, or other samples is displayed on its surface. Further, the scale mark 61, which is provided as a line, an arrow or other marks, indicates the color which has been selected and set.

For example, supposing that the color to be displayed on the tablet 2 is red, "red" among the displays of the light spectrum is adjusted to the scale mark 61 by rotating the rotation section 62. Similarly, when the operator wants to change the display color to blue, it is only necessary for him or her to adjust "blue" to the scale mark 61 by rotating the rotation section 62.

FIG. 7 is an explanatory drawing that exemplifies a case in which the bar (color-selection information) 71 displayed on the tablet 2 is used as the setting circuit.

The light spectrum, color samples ranging from purple to red, or other samples is displayed on the bar 71. Further, display sections 72 and 73 show, for example, ratios at which purple and red are contained in the color components of a specific display color as numeric values.

For example, supposing that the color to be displayed by the display 3 on the tablet 2 is red, it is only necessary to select "red" on the bar 71. When the operator wants to change the display color to blue, it is only necessary for him or her to select "blue" on the bar 71.

Moreover, the color components of the display color are displayed in the display sections 71 and 72 as numeric values; therefore, in the case when the display color is reset, it is possible to easily reset it to even a subtle color by merely confirming the displayed numeric values.

For example, supposing that the operator tries to use "purple red", which was previously used, and that the numeric values previously displayed were "79.50" related to purple and "280.50" related to red (the numeric value is desirably set in the range of 0 to 360), it is only necessary for him or her to display and set the same numeric values previously used, that is, "79.50" related to purple and "280.50" related to red, so as to set the same "purple red" as previously used.

FIG. 8 shows a setting table of colors that are set in the color-conversion circuit 17. Here, purple is represented by a numeric value "0", and red is represented by a numeric value "360"; and between these colors, virtually limitless kinds of colors can be set. The color-conversion circuit 17 converts the phase difference between signals sent from the phase-detection circuit 16 to a color based upon the set numeric values.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A coordinate input device, which detects a signal outputted from a coordinate input pen on the surface of a tablet and converts it into coordinate data, comprising:

a setting device for allowing an operator to set and select a color among virtually limitless kinds of colors;

a phase-conversion circuit for shifting the phase of an ac signal from a device main body based upon the setting and selection by the operator made via the setting device, and for outputting the resulting signal to the coordinate input pen;

an amplification circuit for amplifying the phase-shifted ac signal;

a phase-difference detection circuit for detecting the phase difference between the signal amplified by the amplification circuit and the ac signal from the device main body;

a storage device for storing color information used for carrying out conversion to respective colors that have been preliminarily set in association with values of the phase difference; and a color conversion circuit for outputting, together with coordinate data, a specific piece of color information that corresponds to the phase difference that has been detected by the phase-difference detection circuit from pieces of color information that have been preliminarily stored in the storage in association with phase differences.

2. The coordinate input device as defined in claim 1, wherein the phase-conversion circuit is installed inside the coordinate input pen.

3. The coordinate input device as defined in claim 1, further including a color display provided on the undersurface of the tablet, wherein the phase-conversion circuit is controlled by selecting a color to be displayed through information for color selection displayed on the tablet.

4. A coordinate input device, which detects a signal outputted from a pointing device for specifying a position on a panel on the surface of the panel and converts it into coordinate data, comprising:

a setting device for allowing an operator to set and select a color among virtually limitless kinds of colors;

a phase-control circuit for controlling the phase of an input ac signal based on the setting by the operator, and for outputting the phase-controlled ac signal to the pointing device;

a phase-difference detection circuit for detecting the phase difference between the phase-controlled ac signal and the phase of the input ac signal;

a storage device for storing color information regarding display colors that have been preliminarily set in association with values of the phase difference; and a control circuit for outputting, together with coordinate data, color information regarding to a display color corresponding to the value of the phase difference that has been detected by the phase-difference detection circuit.

5. The coordinate input device as defined in claim 4, further including a color display provided on the under-surface of the panel.

6. The coordinate input device as defined in claim 4, wherein the pointing device is a pen and the setting device is installed in the pen.

7. The coordinate input device as defined in claim 5, wherein the information for color selection, displayed on the panel, functions as the setting device.

8. The coordinate input device as defined in claim 7, wherein information regarding the color components of a color to be displayed is displayed on the panel as numeric values together with the information for color selection.

9. The coordinate input device as defined in claim 4 further including an amplification circuit for amplifying the phase-controlled ac signal output from the pointing device, and for outputting the resulting signal to the phase-difference detection circuit.

10. A program-recording medium, which records a program for detecting a signal outputted from a coordinate input pen on the surface of a tablet and for converting it into coordinate data, the program executing the steps of:

shifting the phase of an ac signal from a device main body based upon setting and selection of a color made by an operator from among virtually limitless kinds of colors;

outputting the resulting signal to the coordinate input pen;

amplifying the phase-shifted ac signal;

detecting the phase difference between the amplified phase-shifted ac signal and the ac signal from the device main body;

preliminarily setting color information used for carrying out conversion to respective colors in association with values of the phase difference;

storing color information used for carrying out conversion to the respective colors that have been preliminarily set; and outputting, together with coordinate data, a specific piece of color information that corresponds to the detected phase difference from pieces of color information that have been preliminarily stored in association with phase differences.

11. The coordinate input device as defined in claim 1, further comprising:

a holding device for storing data of a color signal corresponding to a set value determined in accordance with the setting and selection made by the operator via the setting device.

12. The coordinate input device as defined in claim 4, further comprising:

a holding device for storing data of a color signal corresponding to a set value determined in accordance with the setting and selection made by the operator via the setting device.

13. The program recording medium as defined in claim 10, further comprising the step of:

storing data of a color signal corresponding to a set value determined based upon the setting and selection of a color made by the operator among virtually limitless kinds of colors.

14. The coordinate input device as defined in claim 1, wherein the setting device is a rotation section installed in the coordinate input pen.

* * * * *